US007386480B2

(12) United States Patent
Sarig

(10) Patent No.: US 7,386,480 B2
(45) Date of Patent: Jun. 10, 2008

(54) SYSTEM AND METHOD FOR PROVIDING ACCESS TO DIGITAL GOODS OVER COMMUNICATIONS NETWORKS

(76) Inventor: Amnon Sarig, 5953 Vista De La Luz, Woodland Hills, CA (US) 91367

( * ) Notice: Subject to any disclaimer, the term of this patent is extended or adjusted under 35 U.S.C. 154(b) by 727 days.

(21) Appl. No.: 10/323,668

(22) Filed: Dec. 20, 2002

(65) Prior Publication Data

US 2003/0212613 A1 Nov. 13, 2003

Related U.S. Application Data

(60) Provisional application No. 60/378,239, filed on May 7, 2002.

(51) Int. Cl.
*G06Q 30/00* (2006.01)

(52) U.S. Cl. .......................................... 705/26; 705/51

(58) Field of Classification Search .................. 705/26, 705/27

See application file for complete search history.

(56) References Cited

U.S. PATENT DOCUMENTS

| | | | | |
|---|---|---|---|---|
| 5,732,219 | A * | 3/1998 | Blumer et al. | 709/227 |
| 6,014,644 | A * | 1/2000 | Erickson | 705/37 |
| 6,035,329 | A * | 3/2000 | Mages et al. | 709/217 |
| 6,385,596 | B1 * | 5/2002 | Wiser et al. | 705/51 |
| 6,438,232 | B1 * | 8/2002 | Mages et al. | 380/203 |
| 2002/0152267 | A1 * | 10/2002 | Lennon | 709/203 |

OTHER PUBLICATIONS

Dunnill, R. "The Origins of the Original Divx", Jan. 17, 2002. Retrieved from http://www.g4techtv.com/techtvvault/features/35912/The_Origins_of_the_Original_Divx_pg1.html.*

White, Ron "How it Works: Napster", Jan. 1, 2001. Retrieved from http://specials.zdnet.co.uk/hellp/tips/story/0,2802,e7107720,00.html.*

Tyson, Jeff "How the Old Napster Worked", Feb. 5, 2002. Retrieved from http://computer.howstuffworks.com/napster.htm/printable.*

Sotira, Angelo "Step 1: What is Gnutella?", Dec. 3, 2001. Retrieved from http://www.gnutella.com/news/4210.*

Townley, John "Scour To Axe File-Sharing, Goes On Block", Nov. 15, 2000. Retrieved from http://www.internetnews.com/bus-news/print.php/8161_512111.*

Hahn, Harley, "The Internet Complete Reference", second edition, 1996, pp. 217-222.*

* cited by examiner

*Primary Examiner*—Naeem Haq

(57) ABSTRACT

A system, method and computer program product that allows real-time, secure access to digital multimedia files over a communications network (e.g., the Internet) is provided. The system allows a user to receive large amounts of multimedia data without requiring a high bandwidth data path to an Internet server. The method and computer program product allow the user to employ a selection process from a hypertext data page to obtain and view/play the contents of specific sets of multimedia data which are stored in a storage device local to the user. The files on the local device are unusable without the instructions from the hypertext page. The present invention involves no change to standard WWW protocols, allows the user to interact in a regular-fashion with all other WWW servers and controls the multimedia server over a standard Internet connection.

12 Claims, 7 Drawing Sheets

SYSTEM AND METHOD FOR PROVIDING ACCESS TO DIGITAL GOODS OVER COMMUNICATIONS NETWORKS

This application claims priority from U.S. Provisional Application Ser. No. 60/378,239, filed May 7, 2002. The entirety of that provisional application is incorporated herein by reference.

BACKGROUND OF THE INVENTION

1. Field of the Invention

The present invention relates generally to systems and methods for accessing digital files over communications networks, and more particularly to systems and methods that provide real-time, secure searching, management and access to multimedia information files over such networks.

2. Related Art

In the World Wide Web (WWW) environment, a set of protocols are used to allow a user to locate specific pieces of information (commonly referred to as "Web pages") and to request their transmission to the user's workstation. A client program executing locally on the user's machine (e.g., a personal computer (PC)) known as a Web browser facilitates such request and allows the requested information to be displayed on the user's screen in a window.

On the WWW, every piece of information (Web pages, files and the like) is uniquely identified by a Universal Resource Locator (URL) which has four main parts: (1) the Internet address of the Web server machine hosting the information (also known as the IP address of the server machine); (2) the port where the Web server software process can be found (the port number usually defaults to the number 80); (3) the name of the directory where the page resides on the Web server machine; and (4) the name and type of the file containing the information.

In the above-described environment, the Hyper Text Transfer Protocol (HTTP) is used during communications between the user and the WWW server. HTTP runs over the Transmission Control Protocol (TCP) and the Internet Protocol (IP), which are all standard Internet protocols. Typically, the communication model employed in the Internet and the WWW is that the client and server machines use a single full duplex link to exchange data as well as commands and responses necessary to exchange the actual data.

In all cases, the information is transmitted to the client at a data rate which cannot exceed the bandwidth of the full duplex link between the Web server and client machines. Typically, this is limited to a range from a few kilobits per second (kbps) to a few megabits per second (Mbps). In most cases, however, client machines are not connected to Web servers over a high bandwidth link. Therefore, communication of large multimedia (e.g., text, graphics, sound, voice and video) files over the Internet is a time-consuming process. Due to the long transmission times, clients do not typically request that Web servers transmit large files over such slow links. Additionally, control of copyrighted multimedia files (i.e., copyrighted music or movies) when they are allowed to be downloaded over the Internet, is problematic. That is, owners of such copyrighted material are not assured of receiving compensation for their works from the public's Internet downloading activities.

Therefore, given the above, what is needed is a system, method and computer program product for providing real-time, secure access to digital multimedia files over communications networks (e.g., the public Internet or an intranet). The system, method and computer program product should allow text and HTTP screens to be transmitted over any speed link, and a plug-in player on the client side of the link resolves the selection and use of a multimedia file already resident on local storage. The system, method and computer program product should also ensure that, without the plug-in player, the location and use of the multimedia files resident on the local storage is difficult to effect.

SUMMARY OF THE INVENTION

The present invention meets the above-identified needs by providing a system, method and computer program product that allows real-time, secure access to digital multimedia files over communications networks (e.g., the public Internet or an intranet).

The system of the present invention includes a database which stores information associated with several digital files, and a graphical user interface (GUI) for browsing and accessing the database in order to allow a user to search the digital files. The system further includes means for authenticating the identity of the user attempting to access the digital files, and a communications network, connected to the GUI, for receiving a search criteria from the user. The criteria includes search terms reflecting the types of digital files among those available that interest the user. The system also includes means for providing a list of file identifiers to an application player located on the client computer in response to the search and means for the application player to resolve any of the file identifiers into a file pointer corresponding to actual, useable digital files previously-stored on a local storage device accessible by the user.

The method and computer program product of the present invention includes the steps of receiving, via a communications network, a request to access a library of digital goods from a subscriber using a client computer and then authenticating the identity of the subscriber. Once authenticated, the subscriber can then perform a search using criteria reflecting the types of digital files among those available in the library that interest the subscriber. In response to the search, a list of digital file identifiers responsive to the search criteria is then displayed on a GUI for the subscriber to browse. Then, in response to a selection from the subscriber, one of the file identifiers is provided to an application player located on the subscriber's computer. The application player can then resolve the selected file identifier into a file pointer corresponding to a digital goods file previously-stored on a local storage device accessible by the subscriber's (client) computer.

An advantage of the present invention is that it allows a client and a multimedia server to communicate over a communications network (e.g., the global, public Internet) using current standard protocols, but with the enhancement of enabling the server to send commands to the client computer to find and use a file on a local storage medium. Thus, the present invention allows rapid access to large multimedia files without transmission latency, while allowing the server to control access to the protected (e.g., copyrighted, encrypted, etc.) files stored on the multimedia local storage.

Another advantage of the present invention is that it provides a method for real-time delivery of multimedia information without requiring a high bandwidth path (e.g., a T1 line) over the communications network.

Yet another advantage of the present invention is that it does not require any deviation from the conventional full duplex link (e.g., modem connections, local area network links and the like) to communicate and exchange information as prescribed by the Internet communication model and protocols.

Yet another advantage of the present invention is that it allows music/video production companies to occupy less physical office space. That is, production companies no longer require office square footage to store physical CDs, DVDs and video tapes. Rather, an application service provider implementing the present invention may offer an inexpensive local storage device with an equivalent library of digital files (and provide monthly updates) which can be securely searched, browsed and accessed via a Web site by production companies on a subscription or pay-per-use basis.

Further features and advantages of the invention as well as the structure and operation of various embodiments of the present invention are described in detail below with reference to the accompanying drawings.

DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

I. Overview

Figure 1:
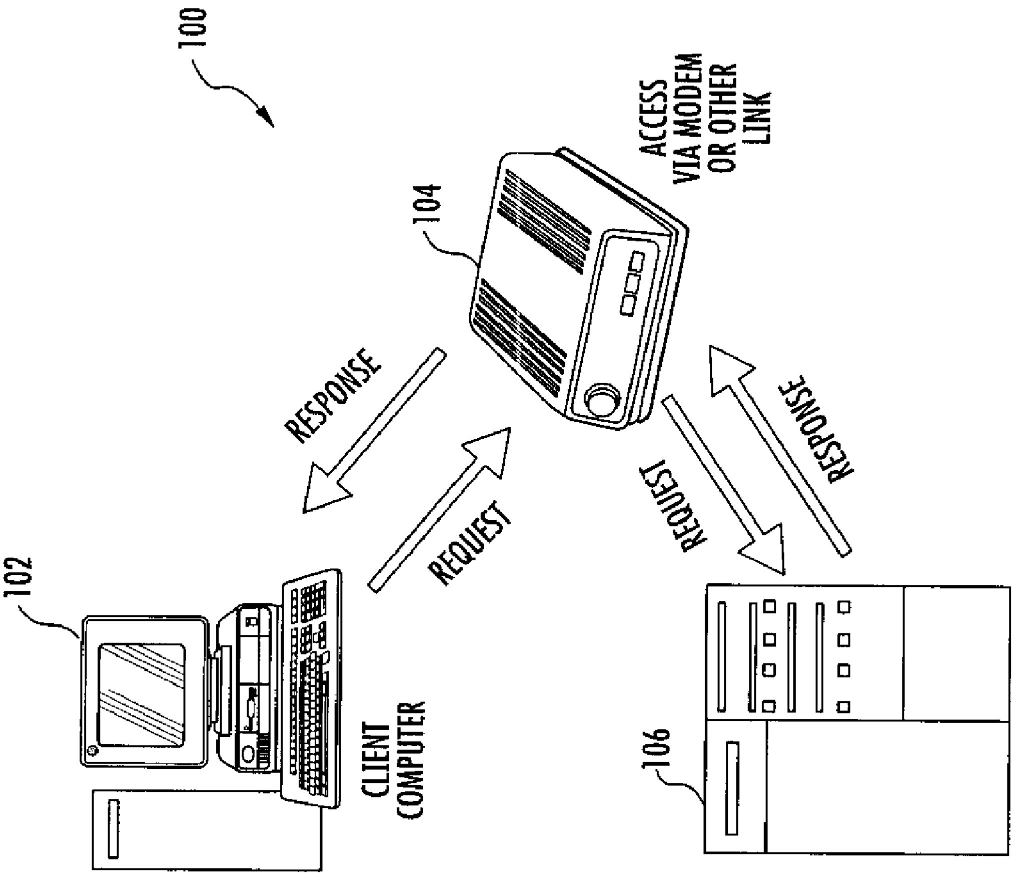
FIG. 1 is a block diagram illustrating the system architecture of a conventional (i.e., prior art) digital file delivery system, showing connectivity among the various components.

The present invention provides a system, method and computer program product for providing real-time, secure management, sampling, selection and access to digital multimedia files over communications networks.

In an embodiment of the present invention, an entity would allow access, on a subscriber or per-use basis, to a digital goods access tool according to the present invention via a World-Wide Web (WWW) site on the Internet.

In the environment of such an embodiment, the entity (i.e., an application service provider (ASP)) would provide the hardware (e.g., Web server) and software (e.g., browser plug-ins) infrastructure, multimedia catalog and licensing authority, customer support, service agreements and billing mechanism to allow its subscribers to manage, sample, select and access digital goods (e.g., multimedia files representing song recordings, sheet music, video games, graphics and clip art, motion pictures, application software, books, maps and the like), whether capable of or actually protected by copyright, over the Internet in a real-time and secure fashion.

More specifically, in the embodiment described above, an entity which sells or licenses access to digital goods that are too large to be economically delivered over the Internet may employ the present invention. The ASP entity would deliver a local copy of the digital files with remote management, licensing and access provided only via a proprietary Web site accessible over the Internet. Even in the case of small files (e.g., stock photos), the present invention eliminates the risk of theft (e.g., someone visiting the ASP's Web site and collecting the digital goods without paying), because the actual digital good assets are not stored on the entity's Web server but previously-shipped to verified (i.e., paying) subscribers.

In another example, a movie vendor can send to consumers' homes an inexpensive storage device (e.g., a hard drive, zip drive disk, high-density DVD, high-density CD-ROM or the like) containing a large library of movies. To view the movies, the consumer would need to go on-line (via a PC, set-top box or the like) and pay per view. The present invention thus eliminates the need for hours of downloading (i.e., it is truly an "on demand" system).

The present invention is now described in more detail herein in terms of the above examples. This is for convenience only and is not intended to limit the application of the present invention. In fact, after reading the following description, it will be apparent to one skilled in the relevant art(s) how to implement the following invention in alternative embodiments (e.g., for the access of digital goods other than multimedia files and over networks other than the global, public Internet such as a dedicated dial-up line).

The terms "user," "customer," "subscriber," "client," and the plural form of these terms may be used interchangeably throughout herein to refer to those who would access, use, and/or benefit from the tool that the present invention provides for real-time, secure management, sampling, selection and access to digital goods over a communications network.

II. System Architecture

Referring to FIG. 1, a block diagram of a conventional system architecture 100 for digital file delivery over a communications network (e.g., the Internet) is shown.

Conventional system architecture 100 supports the typical steps involved in multimedia information browsing over the Internet. A client computer or workstation 102 (e.g., an IBM™ or compatible personal computer (PC) running the Microsoft® Windows 95/98™ or Windows NT™ operating system, a Macintosh® computer running the Mac® OS operating system or the like), executing a commercially-available Web browser (e.g., the Microsoft® Internet Explorer or Netscape® browser), connects using IP through a communications link infrastructure 104 (e.g., a modem utilizing the Public Switch Telephone Network (PSTN), a DSL line or the like) to a Web server 106 executing at an Internet WWW site. A response is returned via link 104 listing the files available for downloading. The client (i.e., user) selects one of the files via an HTTP request and a download of the file is initiated over link 104. Once the file is downloaded to computer 102, it is freely available for playing/viewing.

Conventional system 100 and its conventional method of use suffers from long transmission times (especially in the case of large multimedia files) over slow links 104. Additionally, authorized access and control of copyrighted multimedia files (e.g., copyrighted music or movies) available from an ASP operating Web server 106 may be problematic.

Figure 2:
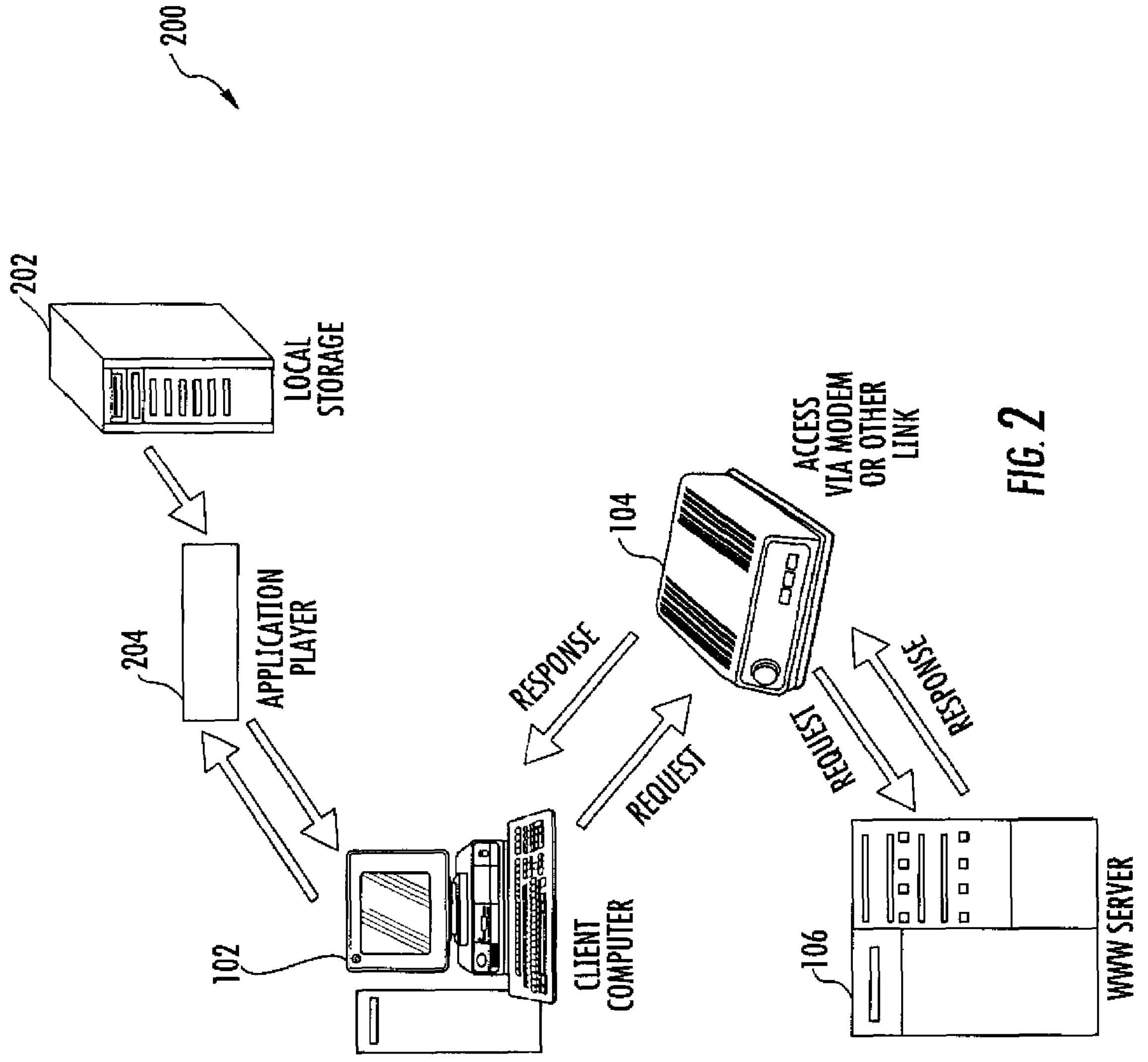
FIG. 2 is a block diagram illustrating the system architecture of an embodiment of the present invention, showing connectivity among the various components.

Referring to FIG. 2, a block diagram illustrating the architecture of a digital goods access (DGA) system 200 according to an embodiment of the present invention is shown. DGA system 200 includes client computer 102, link 104 and Web server 106 as explained above. More specifically, server 106 contains a Web server process executing at an ASP's proprietary Web site which sends out Web pages in response to HTTP or Hypertext Transmission Protocol, Secured (HTTPS) requests from remote browsers (i.e., customers/subscribers of the ASP's DGA system 200). More specifically, it provides a graphical user interface (GUI) "front end" screens to subscribers of DGA system 200 in the form of Web pages. These Web pages, when sent to the subscriber's workstation 102 (or the like), would result in GUI screens being displayed.

In addition, DGA system 200 includes a local storage 202 coupled to client computer 102 and an application player 204 available for execution on client computer 102.

As will be appreciated by one skilled in the relevant art(s), in an embodiment, DGA system 200 also includes a database (not shown in FIG. 1, bus accessible to server 106) that acts as a central store for information within DGA system 200 (e.g., library and digital file titles, descriptions, subscriber information such as login names, passwords, billing information, etc., and system event records for billing and monitoring purposes).

In an embodiment of the present invention, an ASP operating Web server 106 would deliver local storage device 202 (e.g., an external hard drive with a Universal Serial Bus (USB) interface capable of cable connection to client computer 102, a storage area network (SAN) device, a network attached storage (NAS) device, JBOD ("Just a Bunch of Disks") system or any other local or network storage element) to its subscribers. In such an embodiment, local storage device 202 would include one or more catalogs (i.e., libraries containing a large number) of multimedia files named and arranged in a non-useful way. That is, for example, local storage device 202 may contain a single directory with 100,000 files named "1.wav," "2.wav," "3.wav," etc. Thus, the subscriber would need to connect to the ASP's Web server 106 via link 104. Once at the ASP Web site, the subscriber can obtain real-time, secure management, sampling, selection and access to these digital multimedia files stored on local storage 202.

For example, the user can search or browse the catalog on the Web site in an organized and meaningful fashion, select one of the files and a click on an icon that launches application player 204. Once launched, application player 204 determines where the file resides on local storage 202 and then plays the file directly from local storage 202 without any time consuming downloading over link 104. The effect is rapid, almost immediate retrieval of large multimedia files where DGA system 200 is a search, retrieval and management tool using components on client computer 102 and other components accessible over the Internet.

In an alternate embodiment, the files on local storage device 202 are encrypted in a well-known manner (e.g., DES, RSA or the like) and thus, the subscriber would need to connect to the ASP's Web server 106 to additionally obtain decryption of such files by application player 204.

In an embodiment of the present invention, the ASP would provide subscribers with updated local storage devices 202 on a periodic basis (e.g., weekly, monthly, quarterly, etc.) as new digital goods content becomes available (e.g., new movie or music releases). In such an embodiment, the newly-shipped storage devices 202 can totally replace the previously-shipped storage devices or can be connected with the previously-shipped storage devices in a daisy-chain manner.

In an embodiment, application player 204 is a plug-in to the commercially-available browser executing on client computer 102. In such an embodiment, the application player 204 plug-in would be developed and distributed by the ASP entity. As will be apparent to one skilled in the relevant art(s) after reading the description herein, the ASP may cause the plug-in to be downloaded to computer 102 during the registration process when a subscriber registers for the services of DGA system 200. In an alternate embodiment, the plug-in could be loaded directly onto computer 102 from a CD-ROM or other media made available to subscribers by the ASP prior to the registration process. As will be also apparent to one skilled in the relevant art(s) after reading the description herein, the ASP would make several different plug-ins available, based on the processor, operating system and/or the specific browser being used by the subscriber on computer 102.

More detailed descriptions of DGA system 200 components, as well as their functionality, are provided below.

III. System Operation

Figure 3:
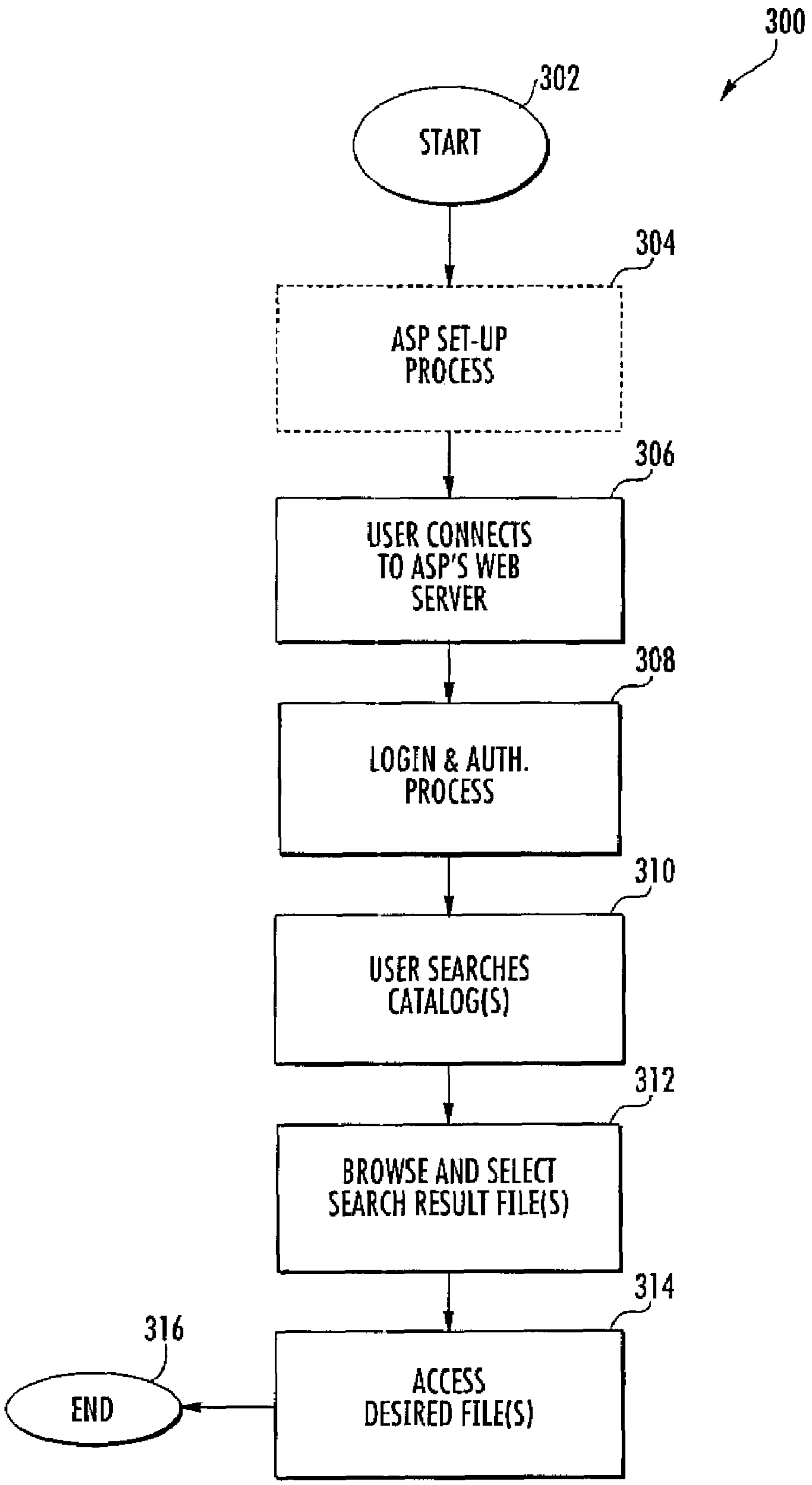
FIG. 3 is a flowchart depicting an embodiment of the operational process of the digital goods access system of the present invention.

Referring to FIG. 3, a flowchart illustrating a digital goods access process 300 according to an embodiment of the present invention is shown. Process 300 begins at step 302 with control passing immediately to step 304.

In step 304, a subscriber would access the application service provider's Web site using computer 102 in order to register and obtain an account (i.e., obtain a login and password and establish a billing procedure) for accessing the catalog(s) of digital goods available from the application service provider. As will be apparent to one skilled in the relevant art(s) after reading the description herein, the ASP may sign-up such a subscriber over the Internet, the telephone or in person.

As a result of such a registration process, the user orders a set of (possibly copyrighted) digital goods, and they are delivered via a local storage device 202 and arranged and stored thereon in a non-useful way. Local storage device 202 (e.g., external hard drive with a USB interface and cable) is attached, directly or via a local area network (LAN), to the subscriber's computer 102. In an embodiment of the present invention, the subscriber may itself be an entity running a LAN or wide area network (WAN) with several workstations 102. In such an embodiment, local storage device 202 may be connected to the LAN and accessible by the several users from their respective workstations 102.

Also as a result of such a registration process, multimedia application player 204 plug-in is also delivered to the client for enhancing and extending the operation of the parent Web browser application previously-loaded onto computer 102.

In step 306, the user connects, via link 104 over any high or low bandwidth connection to Web server 106.

In step 308, the user identifies themselves (i.e., using the login and password obtained in step 304) to the server process executing on Web server 106 as will be appreciated by one skilled in the relevant art(s). After validation of the user's identity using the conventional login ID and password protocol, process 300 determines which multimedia files stored on local storage 202 that the user has connected to their computer 102 and which of those files they have been granted access rights.

Figure 4A:
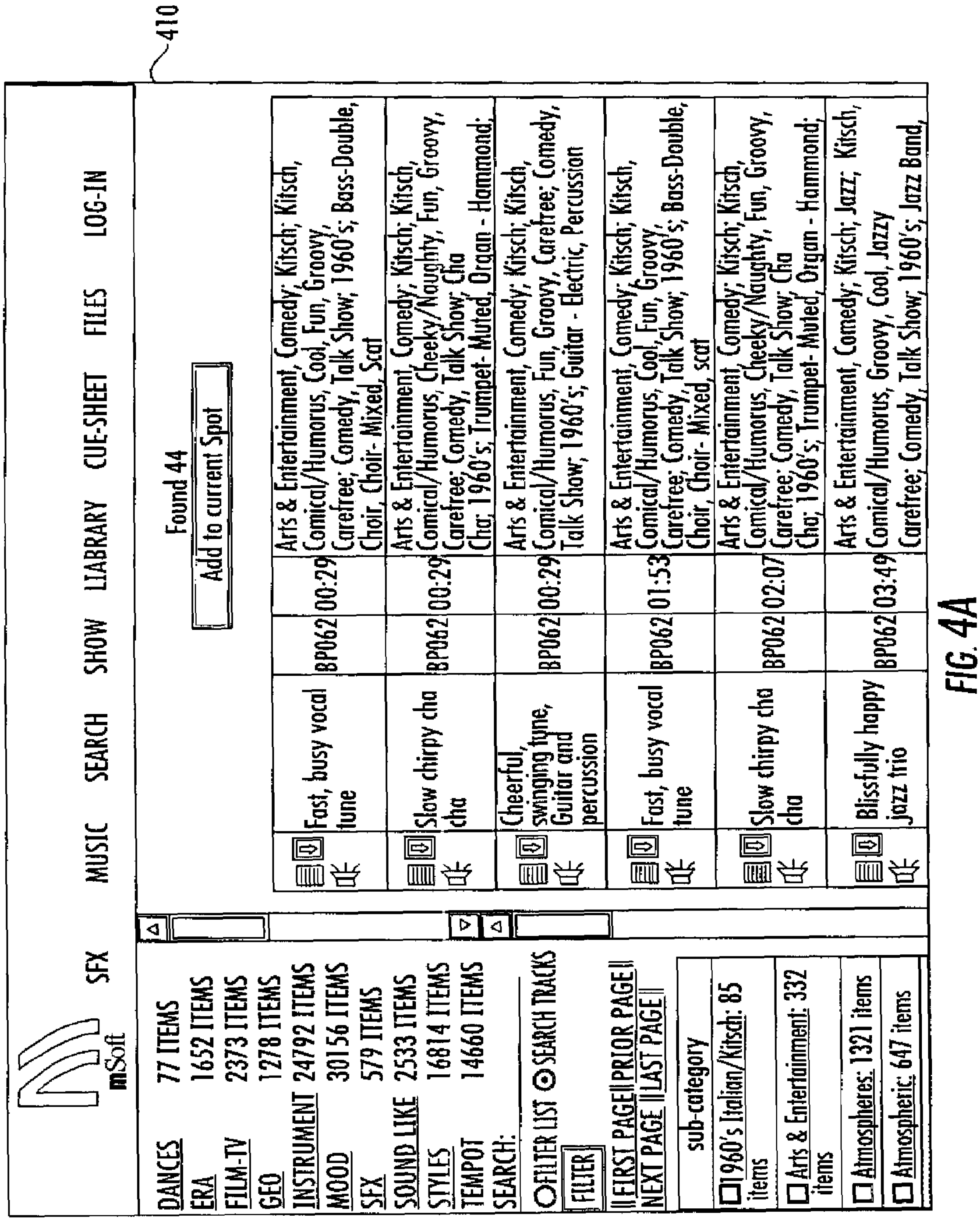
FIGS. 4A-C are exemplary Web-based windows or screen shots generated by the graphical user interface of the present invention.

In step 310, via the Web pages (i.e., GUI) sent out by Web server 106, the user performs a search of the digital goods available from the ASP using any criteria applicable to the user at the time. In an embodiment, the search result is displayed as a list of files on a hypertext page. FIG. 4A is an exemplary window or screen shot 410, displayed on computer 102 during step 310. Step 310 facilitates the process of the user making a request for a specific multimedia file for which access is desired (and for which among those the user currently has stored locally on storage device 202).

In step 312, the user can click on various link/buttons on screen 410 to browse or actually use a specific file. In an embodiment where a subscriber is a producer, clicking on various buttons on screen 410 would allow the selection of multiple files to build a project list. That is, in step 312, clicking on appropriate links/buttons on screen 410 will allow the browsing (auditioning) and actual incorporation of a file into a multimedia production which is being edited by the subscriber/producer on their computer 102.

Figure 4B:
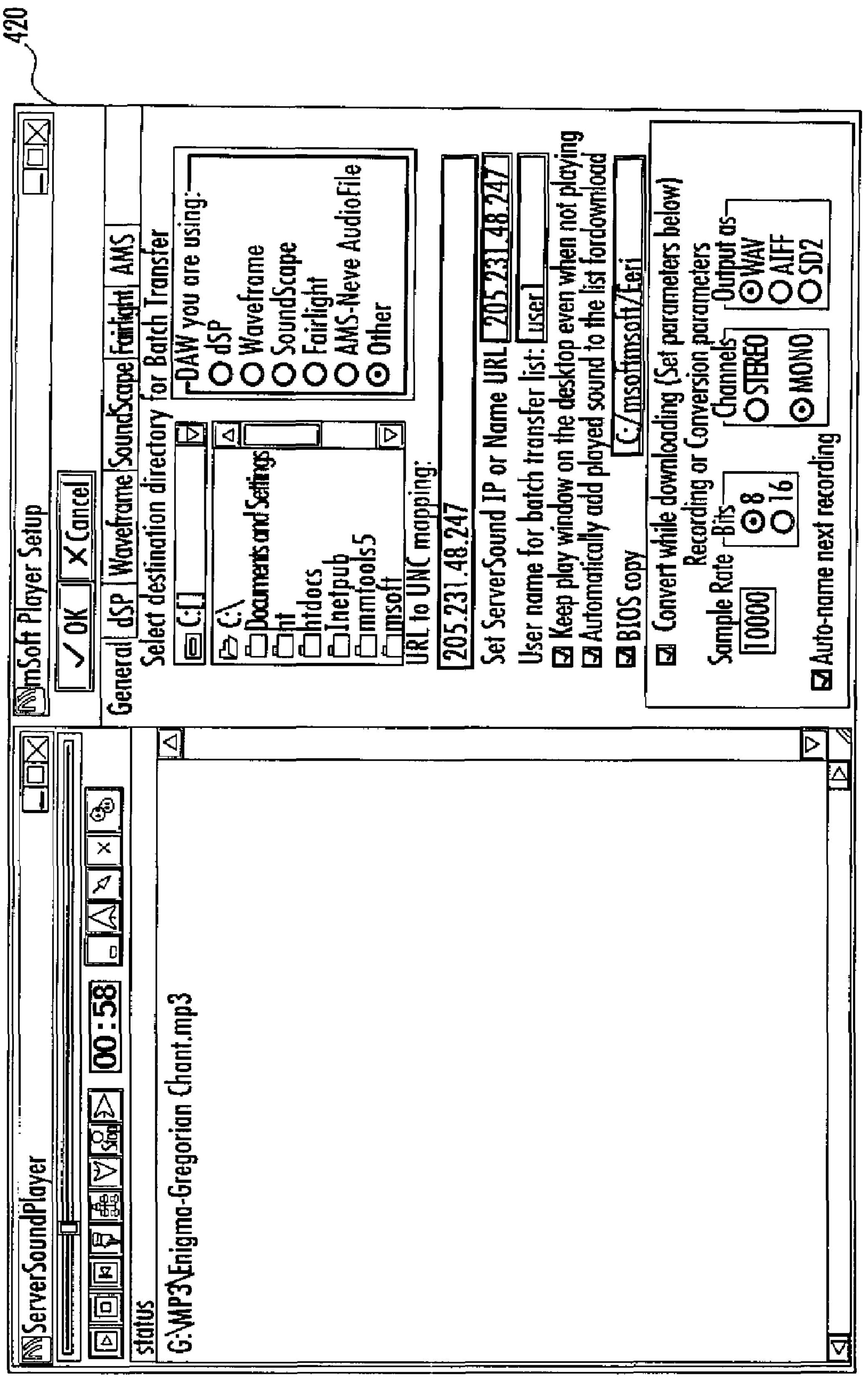

In step 314, application player 204 will resolve information from the hyperlink page, and control the appropriate file access on storage device 202. FIG. 4B is an exemplary window or screen shot 420, displayed on computer 102 during step 310. Web server 206 (in step 310) builds an HTML menu file containing descriptions and hidden file identifiers. These identifiers contain enough information to allow application player 204, in step 314, to resolve the file identifiers into file pointers describing the corresponding files on local storage 202. This is done, in an embodiment, by re-routing a relative file address to a physical file location on the directly attached storage or local area shared attached storage 202.

Referring to FIG. 4B, the user may click on the speaker button to play back a music file, video file, etc. Application player 204 will accept the URL and reroute the relative address supplied to an address suitable for local storage drive 202. For example, the HTML provided by Web server 106 on screen 420 may be:

plySnd('/SFXF/BPM/BP062/
SLOWCHIRPYCHACHA2501.mp3');

and application player 204 will reroute this HTML to a local storage drive 202 address, such as:

file:///[D]:/Music/GoodStuff/BPM/BP062/
0012342501.mp3.

As will be apparent to one skilled in the relevant art(s) after reading the description herein, the file identifiers need to contain enough information to allow application player 204, in step 314, using standard router technology, to resolve the identifiers from an apparent random number, into file pointers describing corresponding files on local storage 202. Player 204 resolves the hidden information describing each file listed on the hypertext page into local file addresses. It plays the local file when a button is clicked. It converts the file as necessary to what ever format the user requires. In an embodiment, player 204 may export the converted file into editing equipment (e.g., a Digital Audio Workstation, or Digital Video Workstation).

In sum, the user will select one of the files as described on the selection menu, (in step 312) and the application player retrieves the file from the local storage for playback or integration into another application (in step 314). The files are retrieved from local storage 202 and accessible to the user without the need for transmission over the Internet.

When the multimedia file is delivered or when the user terminates application player 204, control passes from the application player 204 plug-in back to the browser. The control flow of process 300 may then end as indicated by step 316.

IV. Security and Access Rights

In an embodiment of the present invention, access to the ASP's libraries of digital goods is given on a subscription basis. The fees for such subscriptions are not only to compensate the ASP, but also to compensate the respective copyright owners of the individual multimedia files (where such copyright owners are different persons or entities than the ASP).

In an embodiment of the present invention, three pieces of information—the identity of each subscriber, a specified collection of digital goods (i.e., a library) they have subscribed to, and the expiration date ("kill date") of the subscription—is used as the basis for encrypting all information within DGA system 200. For example, an encryption code would serve to expire access to "user1" on "08/30/2005" for a library collection named "FCA". There are as many combinations per set of {user, library, expiration-date} as the digital goods owner wishes to include. Any of the well-known encryption techniques (e.g., DES, RSA or the like) may then be employed.

In a specific embodiment, the encryption is a private lock with a public key, where the key is always the current (i.e., today's) date, the user login information and the library code. Within the string of such a lock, the information is encoded in a cyclic redundancy manner with complementing pairs of numbers. These numbers allow unlimited combinations for the lock to be opened. However each combination needs the complementary portion to fit as well. In a physical sense, as will be apparent to one skilled in the relevant art(s) after reading the description herein, the above-described scheme is analogous to taking a physical lock and turning it in space (i.e., holding it upside down and/or rotating it). Each prospective makes the lock appear slightly different. However, the proper key will fit the lock if its position in space is properly adjusted to the position of the lock. The encryption employed in DGA system 200, in an embodiment, is a mathematical implementation of this strategy in order to release certain digital group of goods for certain periods of time to certain users.

Figure 4C:
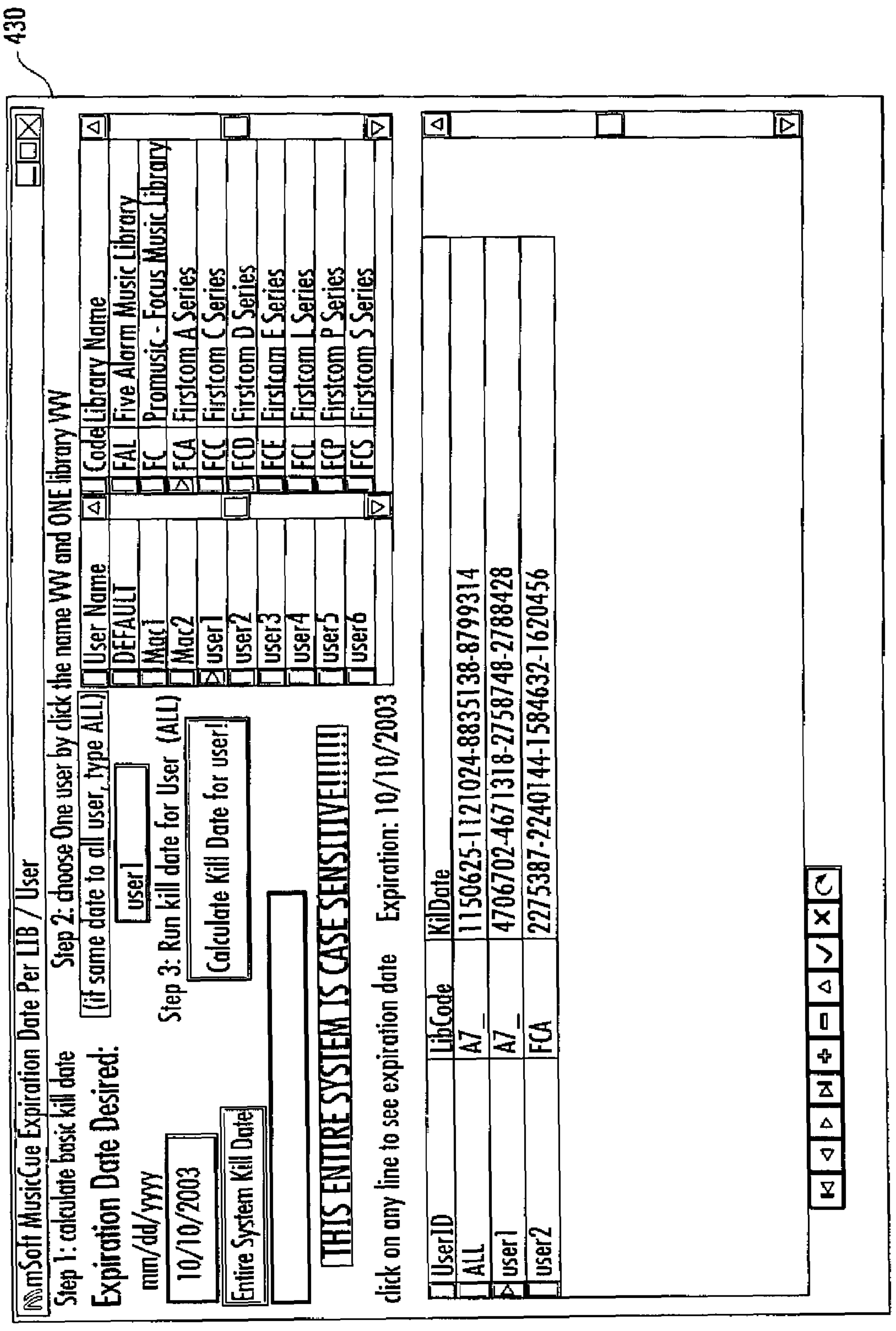

FIG. 4C is an exemplary window or screen shot 430, displayed on computer 102 during a validation process.

In a further embodiment, a user may subscribe to multiple libraries or collections of digital goods and have different expiration dates for each respective library.

In an embodiment, during step 312 of process 300, a user's access rights are checked {user, library, expiration-date} before allowing access to the digital file. If the user does not have rights to a particular file which might satisfy the user's needs, and if the copyright holder has pre-authorized, then upon selecting the audition of a multimedia file, a low quality sample of the file is down-loaded from the Internet site to the user's local computer, and played. Information on how to obtain full access to this file is also displayed.

In another embodiment, when the rights granted by the copyright holder to the user expire, the ASP's Web site turns off future searches of its database for that subset of multimedia files. Upon subsequent re-granting of the rights, the Web site will once again allow searches of the selected subset of files.

V. Example Implementations

Figure 5:
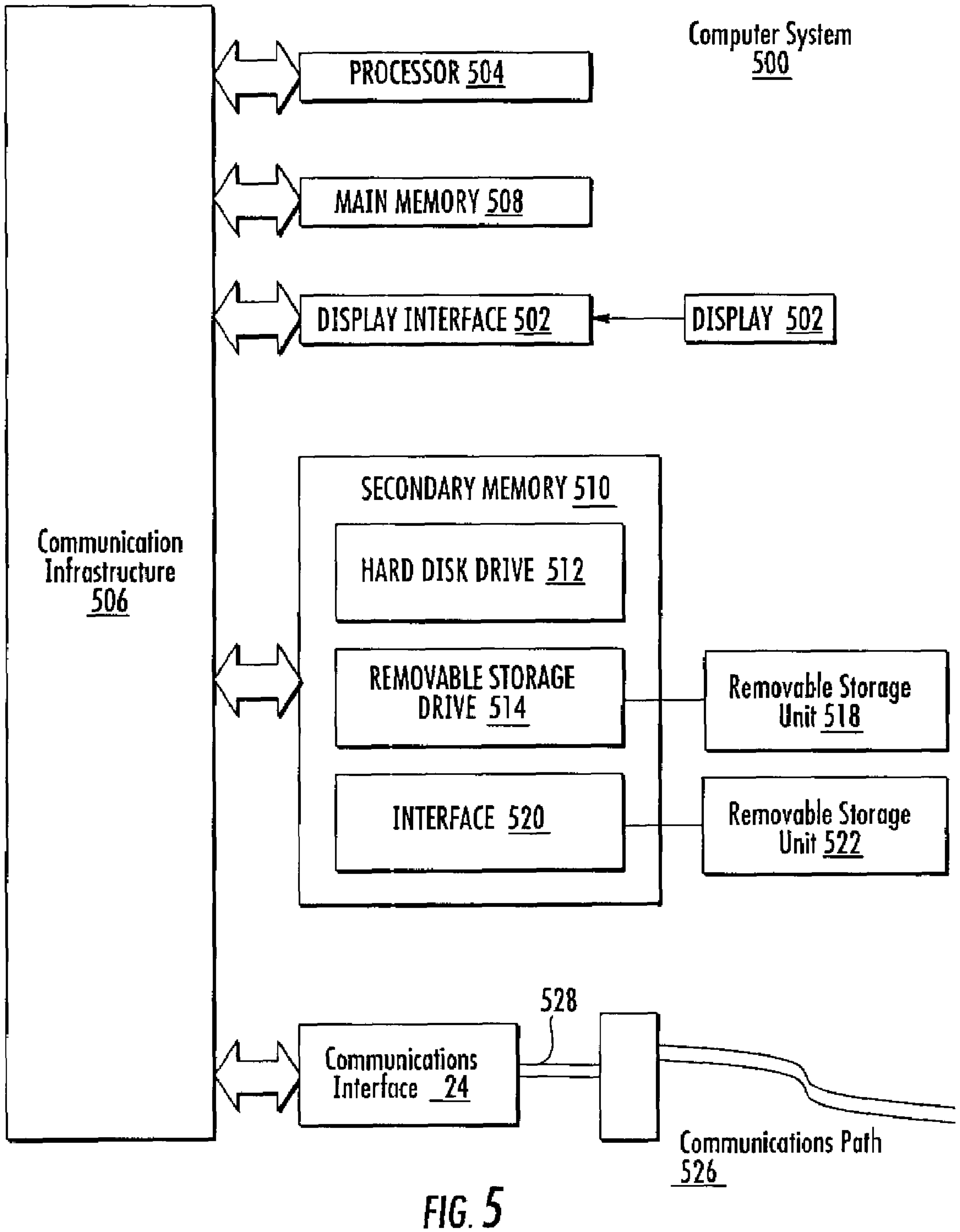
FIG. 5 is a block diagram of an exemplary computer system useful for implementing the present invention.

The present invention (i.e., DGA system 200, DGA process 300 and/or any components(s) or function(s) thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 500 is shown in FIG. 5.

Computer system 500 includes one or more processors, such as processor 504. The processor 504 is connected to a communication infrastructure 506 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 514, a hard disk installed in hard disk drive 512, and signals 528. These computer program products provide software to computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

It should be understood that FIGS. 3 and 4A-C, which highlight the functionality and other advantages of DGA system 200, are presented for example purposes only. The architecture of the present invention is sufficiently flexible and configurable such that users may utilize system 200 in ways other than that shown in FIGS. 3 and 4A-C (e.g., the use of different screen layouts and formats, varying process step orderings or the like).

While various embodiments of the present invention have been described above, it should be understood that they have been presented by way of example and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method for allowing access to digital goods, the method comprising:

delivering a local storage device to a subscriber, wherein the local storage device is a discrete physical unit that directly couples to a client computer through a non-network connection, and wherein the local storage device comprises a library of digital goods previously stored therein;

receiving, at a remote server via a communications network, a request to access the library of digital goods from the subscriber using the client computer;

authenticating, by the remote server, the identity of said subscriber attempting to access said library of digital goods;

receiving, at the remote server via said communications network, a search criteria from said subscriber, said criteria indicative of digital goods of interest to said subscriber from said library;

displaying a list of digital file identifiers responsive to said criteria;

granting access by the remote server to those digital goods for which the subscriber is entitled to have access;

providing, by the remote server, one of said list of file identifiers to an application player located on the client computer in response to an input from said subscriber, wherein said application player resolves said one of said list of file identifiers into a file pointer to a corresponding digital goods file previously-stored on the local storage device; and conveying the corresponding digital goods file from the local storage device to the client computer via the non-network connection.

2. The method of claim 1, wherein said communications network is at least a portion of the Internet.

3. The method of claim 2, wherein each of said list of digital file identifiers is an HTML link.

4. The method of claim 3, wherein said input from said subscriber is an HTTP request.

5. The method of claim 4, wherein said step of providing said one of said list of file identifiers to said application player comprises the step of: providing the client computer with an HTTP response which includes said one of said list of file identifiers.

6. The method of claim 1, wherein the local storage drive is an external hard drive with an USB interface.

7. The method of claim 1, wherein the local storage device is at least one of the following: (i) an external hard drive with an USB interface; (ii) a storage area network (SAN) device; (iii) a network attached storage (NAS) device; (iv) a JBOD system.

8. A system for allowing access to digital goods, the system comprising:

means for delivering a local storage device to a user, wherein the local storage device is a discrete physical unit that directly couples to a client computer through a non-network connection, and wherein the local storage device comprises a library of digital goods previously stored therein;

a database which stores information associated with a plurality of digital files;

a graphical user interface (GUI) for accessing said database and allowing the user to search said plurality of digital files via a remote server;

means for authenticating the identity of said user attempting to access said plurality of digital files;

a communications network, coupled to said GUI, for receiving, at the remote server, a search criteria from said user, said criteria indicative of a subset of said plurality of digital files of interest to said user from said library;

means for authorizing access to those digital goods for which the user is entitled to have access;

means for providing a list of file identifiers to an application player located on the client computer in response to said search criteria;

means for said application player to resolve at least one of said list of file identifiers into a file pointer to a corresponding digital file previously-stored on the local storage device; and means for conveying the corresponding digital goods file from the local storage device to the client computer via the non-network connection.

9. The system of claim 8, wherein said communications network is at least a portion of the Internet.

10. The system of claim 8, wherein the local storage drive is an external hard drive with an USB interface.

11. The system of claim 9, wherein the local storage device is at least one of the following: (i) an external hard drive with an USB interface; (ii) a storage area network (SAN) device; (iii) a network attached storage (NAS) device; (iv) a JBOD system.

12. A computer program product comprising a computer usable medium having control logic stored therein, said control logic comprising:

first computer readable program code means for causing a computer to receive, at a remote server via a communications network, a request to access a library of digital goods from a subscriber using a client computer;

second computer readable program code means for causing the computer to authenticate, by the remote server, the identity of said subscriber attempting to access said library of digital goods;

third computer readable program code means for causing the computer to receive, at the remote server via said communications network, a search criteria from said subscriber, said criteria indicative of digital goods of interest to said subscriber from said library;

fourth computer readable program code for granting access by the remote server to said subscriber to those digital goods for which the subscriber is entitled to have access;

fifth computer readable program code means for causing the computer to display a list of digital file identifiers responsive to said criteria;

sixth computer readable program code means for causing the computer to provide one of said list of file identifiers to an application player located on the client computer in response to an input from said subscriber, said application player resolving said one of said list of file identifiers into a file pointer to a corresponding digital goods file previously-stored on a local storage device, and said local storage device being a discrete physical unit that directly couples to a client computer through a non-network connection and having a library of digital goods previously stored therein;

seventh computer readable program code means for causing the computer to convey the corresponding digital goods file from the local storage device to the client computer via the non-network connection.

* * * * *